United States Patent
Ho et al.

(10) Patent No.: US 7,233,555 B2
(45) Date of Patent: Jun. 19, 2007

(54) METHOD FOR ADJUSTING OPTICAL AXIS OF OPTICAL DISC DRIVE

(75) Inventors: Chi-Hwa Ho, Taipei (TW); Zong-Lin Wu, Chiai (TW)

(73) Assignee: ASUSTek Computer Inc., Taipei (TW)

( * ) Notice: Subject to any disclaimer, the term of this patent is extended or adjusted under 35 U.S.C. 154(b) by 524 days.

(21) Appl. No.: 10/659,371

(22) Filed: Sep. 11, 2003

(65) Prior Publication Data

US 2004/0057362 A1    Mar. 25, 2004

(30) Foreign Application Priority Data

Sep. 19, 2002    (TW) ............................. 91121430 A

(51) Int. Cl.
*G11B 7/00* (2006.01)
(52) U.S. Cl. ................................... 369/53.19
(58) Field of Classification Search .............. 369/53.19
See application file for complete search history.

(56) References Cited

U.S. PATENT DOCUMENTS

| | | | | |
|---|---|---|---|---|
| 5,956,188 A * | 9/1999 | Lee | ............................. | 359/822 |
| 6,014,362 A * | 1/2000 | Park | ............................. | 720/697 |
| 6,295,255 B1 * | 9/2001 | Seo et al. | ................. | 369/44.32 |
| 6,353,590 B1 * | 3/2002 | Knudsen et al. | ............. | 720/659 |
| 6,493,309 B2 * | 12/2002 | Sogawa et al. | ............. | 720/674 |
| 6,744,716 B1 * | 6/2004 | Takemoto | ................. | 369/53.19 |
| 2004/0057352 A1 * | 3/2004 | Kim et al. | ................. | 369/44.32 |

* cited by examiner

*Primary Examiner*—William Korzuch
*Assistant Examiner*—Joseph Haley
(74) *Attorney, Agent, or Firm*—Rabin & Berdo, P.C.

(57) ABSTRACT

A method for adjusting an optical axis of an optical disc drive. The method includes the following steps. A first reflecting member is disposed on a turntable of the optical disc drive, and is rotated along with the turntable. A laser light is emitted on the first reflecting member by a laser collimator, and a normal vector of the turntable is measured based on a light point reflected to the laser collimator from the first reflecting member. A second reflecting member and a third reflecting member are disposed on a guide bar of the optical disc drive. A first initial vector and a second initial vector are measured based on a light point reflected to the laser collimator from the second reflecting member and the third reflecting member. The guide bar is adjusted based on an oblique vector of an optical of an optical pickup of the optical disc drive, the normal vector of the turntable, the first initial vector, and the second initial vector so that the optical axis of the optical pickup is parallel to the normal vector of the turntable.

5 Claims, 9 Drawing Sheets

METHOD FOR ADJUSTING OPTICAL AXIS OF OPTICAL DISC DRIVE

BACKGROUND OF THE INVENTION

1. Field of the Invention

The invention relates to a method for adjusting an optical axis of an optical disc drive; in particular, to an adjusting method that can assist the optical disc drive in more accurately obtaining the data of an optical disc disposed thereon.

2. Description of the Related Art

Optical disc drives use light to transform information stored on an optical disc to a machine-readable format, e.g., binary data. Examples of optical disc drives are known in the art as compact disc drives (often referred to simply as CDs) and digital versatile disc drives (often referred to simply as DVDs). Some optical disc drives have the additional capability of being able to write data onto an optical disc by the use of a light source, e.g., a laser. Optical disc drives are used in various applications including music and video playing and recording devices and computer data storage devices.

When the data of an optical disc is obtained by the optical disc drive, an RF signal jitter transmitted from an optical pickup of the optical disc drive is proportional with an error rate. That is, when the jitter is greater, the error rate is also greater. Furthermore, when the jitter becomes too great, the data of the optical disc cannot be obtained by the optical disc drive. If the optical quality of the laser light, reflected to the optical pickup from the optical disc, is enhanced, the RF signal jitter can be inhibited. One manner of enhancing the optical quality is to allow the optical axis of the optical pickup (the laser light path emitted from the optical pickup) to be normal with the surface of the optical disc. Thus, the refractive loss and the diffusive loss of the laser light are decreased during reflection. As a result, in a conventional optical disc drive, a mechanism for adjusting its turntable or its guide bar is additionally disposed. Thus, a plane formed by the turntable or the guide bar can be adjusted to compensate the assembly error and the error of the optical axis of the optical pickup. Especially for DVDs, the effect of RF signal jitter due to the error of the optical disc drive is more apparent than that of CDs. Thus, the adjusting mechanism has become standard equipment in DVD players.

In a conventional process for manufacturing the optical disc drive, the optimal adjustment of the adjusting mechanism is determined based on the error rate or the value of the RF signal jitter obtained from the test disc. During adjustment, the lowest value of the error rate or the RF signal jitter is the optimal adjustment. However, among the factors that influence the error rate or the RF signal jitter, there are many factors other than the degree of inclination of the optical axis of the optical pickup, such as the quality of the optical disc or circuit noise. That is, the amount of inclination of the optical axis of the optical pickup is not the only factor. Thus, in the conventional adjusting process, the optimal adjustment is the optimal adjustment of the test disc, but not the optical axis of the optical pickup itself. That is, if the test disc is changed to retest the same optical disc drive, the position of the optimal adjustment is also changed. Furthermore, since the factors influencing the error rate and the RF signal jitter are complicated, the lowest value is difficult to judge. Thus, the optimal adjustment is also difficult to judge, and the time required for adjustment increases. As a result, the adjustment causes a bottleneck, and enhanced throughput is difficult to achieve.

SUMMARY OF THE INVENTION

In view of this, the invention provides a method for adjusting an optical axis of an optical disc drive that can assist the optical disc drive in more accurately obtaining the data of an optical disc disposed thereon.

Another purpose of this invention is to provide a device for adjusting an optical axis of an optical disc drive that can reduce the adjustment time and assembly cost.

Accordingly, the invention provides a method for adjusting an optical axis of an optical disc drive. The method includes the following steps. An oblique vector $(X_p, Y_p)$ of an optical axis of an optical pickup of the optical disc drive, a laser collimator, a first reflecting member, a second reflecting member, and a third reflecting member are provided. The optical disc drive includes a guide bar for moving the optical pickup. The first reflecting member is disposed on a turntable of the optical disc drive. The turntable is rotated to rotate the first reflecting member, and a laser light is emitted on the first reflecting member by the laser collimator. A normal vector $(X_{TT}, Y_{TT})$ of the turntable is measured based on a light point reflected to the laser collimator from the first reflecting member. The second reflecting member is disposed on the guide bar of the optical disc drive at a first position, and a laser light is emitted on the second reflecting member by the laser collimator, and a first initial vector $(X_{1s}, Y_{1s})$ is measured based on a light point reflected to the laser collimator from the second reflecting member. The third reflecting member is disposed on the guide bar of the optical disc drive at a second position, and laser light is emitted on the third reflecting member by the laser collimator, and a second initial vector $(X_{2s}, Y_{2s})$ is measured based on a light point reflected to the laser collimator from the third reflecting member. The guide bar is adjusted based on the oblique vector $(X_p, Y_p)$, the normal vector $(X_{TT}, Y_{TT})$, the first initial vector $(X_{1s}, Y_{1s})$, and the second initial vector $(X_{2s}, Y_{2s})$ so that the optical axis of the optical pickup is parallel with the normal vector of the turntable.

In a preferred embodiment, a circular trace is formed by the light point reflected to the laser collimator from the first reflecting member, and the normal vector of the turntable is calculated based on a center of the circular trace.

In another preferred embodiment, the guide bar includes a first bar and a second bar, and the second reflecting member is in contact with the first bar at a first point and a second point and is in contact with the second bar at a third point when the second reflecting member is disposed on the guide bar. The third reflecting member is in contact with the first bar at the first point and the second point and is in contact with the second bar at a fourth point when the third reflecting member is disposed on the guide bar.

Furthermore, the method further includes the following step. The first bar is adjusted to be parallel with the second bar so that the optical axis of the optical pickup is parallel with the normal vector of the turntable when adjusting the guide bar.

Furthermore, the optical disc drive includes a first adjusting screw, a second adjusting screw, and a third adjusting screw. The first adjusting screw is used for adjusting the first bar. The second adjusting screw and the third adjusting screw are used for adjusting the second bar. The first bar is made parallel to the second bar by adjusting the first adjusting screw, the second adjusting screw, and the third adjusting screw when adjusting the guide bar.

Furthermore, a distance between the first point and the second point is $L_1$, and the first adjusting screw is adjusted by $(X_{2S}-X_{TT}+X_p)L_1$. Furthermore, a first vector from the first point to the third point is $(L_{2I}, -L_3)$, and a second vector from the first point to the fourth point is $(L_{2O}, -L_3)$, and a distance between the third point and the second adjusting screw is $L_{IO}$, and a distance between the fourth point and the third adjusting screw is $L_{OO}$. The second adjusting screw is adjusted by $(X_{1S}-X_{TT}+X_P)L_{2I}+(Y_{TT}-Y_P-Y_{1S})L_3-[(X_{2S}-X_{TT}+X_P)L_{2O}+(Y_{TT}-Y_P-Y_{2S})L_3-(X_{1S}-X_{TT}+X_P)L_{2I}-(Y_{TT}+Y_P-Y_{1S})L_3]L_{IO}/(L_{2O}-L_{2I})$. The third adjusting screw is adjusted by $(X_{2S}-X_{TT}+X_P)L_{2O}+(Y_{TT}-Y_P-Y_{2S})L_3+[(X_{2S}-X_{TT}-X_P)L_{2O}-(Y_{TT}-Y_P-Y_{2S})L_3-(X_{1S}-X_{TT}+X_P)L_{2I}-(Y_{TT}-Y_P-Y_{1S})L_3]L_{OO}/(L_{2O}-L_{2I})$.

In this invention, a device for adjusting an optical axis of an optical disc drive is provided. The adjusting device includes a plurality of reflecting members and a laser collimator. The reflecting members are disposed on the optical disc drive. The laser collimator is used for emitting a laser light on the reflecting members and measuring a normal vector of a base of the optical disc drive and a normal vector of a turntable of the optical disc drive.

In a preferred embodiment, the device further includes an adjusting unit for adjustment of adjusting screws of the optical disc drive so that a first bar of the optical disc drive is parallel with a second bar of the optical disc drive and an optical axis of an optical pickup of the optical disc drive is parallel with the normal vector of the turntable.

In another preferred embodiment, a surface, facing the laser collimator, of each of the reflecting members is made of reflective material.

In another preferred embodiment, the laser collimator includes an image pickup for obtaining a light point reflected back to the laser collimator from the reflecting members to form images.

In another preferred embodiment, the device further includes a beam splitter disposed between the laser collimator and the reflecting members. The beam splitter is used for guiding the laser light emitted from the laser collimator to a predetermined position on each of the reflecting members.

BRIEF DESCRIPTION OF THE DRAWINGS

The present invention can be more fully understood by reading the subsequent detailed description and examples with references made to the accompanying drawings, wherein:

FIG. 1a and FIG. 1b are schematic views of a traverse module of a normal optical disc drive, wherein FIG. 1a shows a top surface of the traverse module, and FIG. 1b shows a bottom surface of the traverse module;

FIGS. 2a–f are schematic views showing a method for adjusting an optical axis of an optical disc drive as disclosed in this invention, wherein FIG. 2a shows a first reflecting member of an adjusting device as disclosed in this invention, and FIG. 2b shows a relationship between a laser collimator of the adjusting device and the first reflecting member disposed on a turntable of the optical disc drive, and FIG. 2c shows a second reflecting member of the adjusting device as disclosed in this invention, and FIG. 2d shows a relationship between the laser collimator and the second reflecting member disposed on a guide bar of the optical disc drive, and FIG. 2e shows a third reflecting member of the adjusting device as disclosed in this invention, and FIG. 2f shows a relationship between the laser collimator and the third reflecting member disposed on the guide bar.

DETAILED DESCRIPTION OF THE INVENTION

Figure 1A:
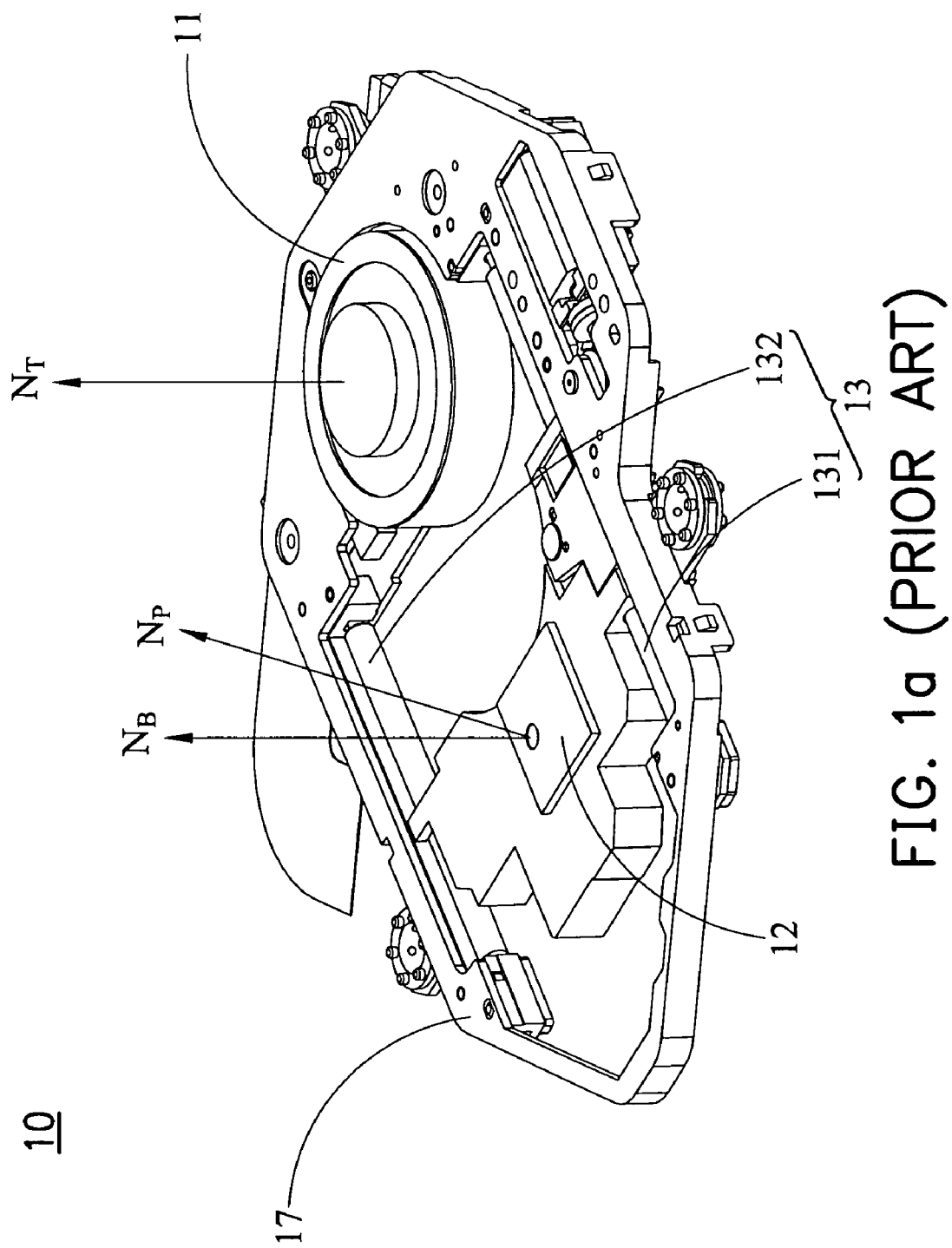
Figure 1B:
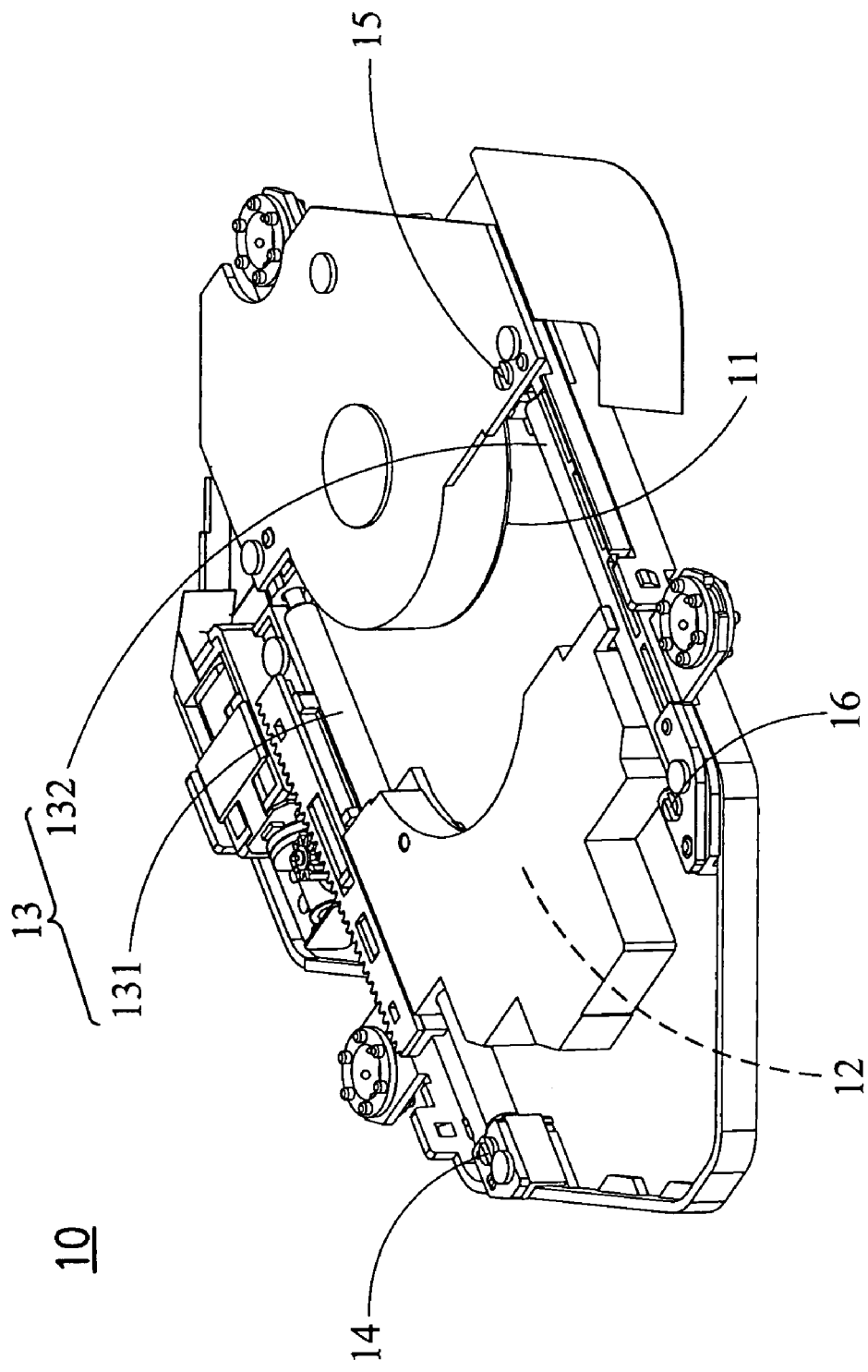

Referring to FIG. 1a and FIG. 1b, a basic construction of a traverse module of a normal optical disc drive is now described. The traverse module 10 includes a turntable 11, an optical pickup 12, a guide bar 13, a first adjusting screw 14, a second adjusting screw 15, a third adjusting screw 16, and a base 17.

The turntable 11 is used for rotating an optical disc (not shown) disposed thereon. The optical pickup 12 is used for obtaining the data of the optical disc. The guide bar 13 includes a first bar 131 and a second bar 132, and is used for moving the optical pickup 12. The first adjusting screw 14 is used for adjusting a position of the first bar 131. The second adjusting screw 15 and the third adjusting screw 16 are used for adjusting a position of the second bar 132. The optical pickup 12 is disposed on the base 17. Since the other components of the traverse module 10 are less relevant to this invention, their description is omitted.

Referring to FIGS. 2a–f, a device for adjusting an optical axis of an optical disc drive is described. The adjusting device includes a laser collimator 21, a first reflecting member 22, a second reflecting member 23, a third reflecting member 24, and a beam splitter 25.

Figure 2A:
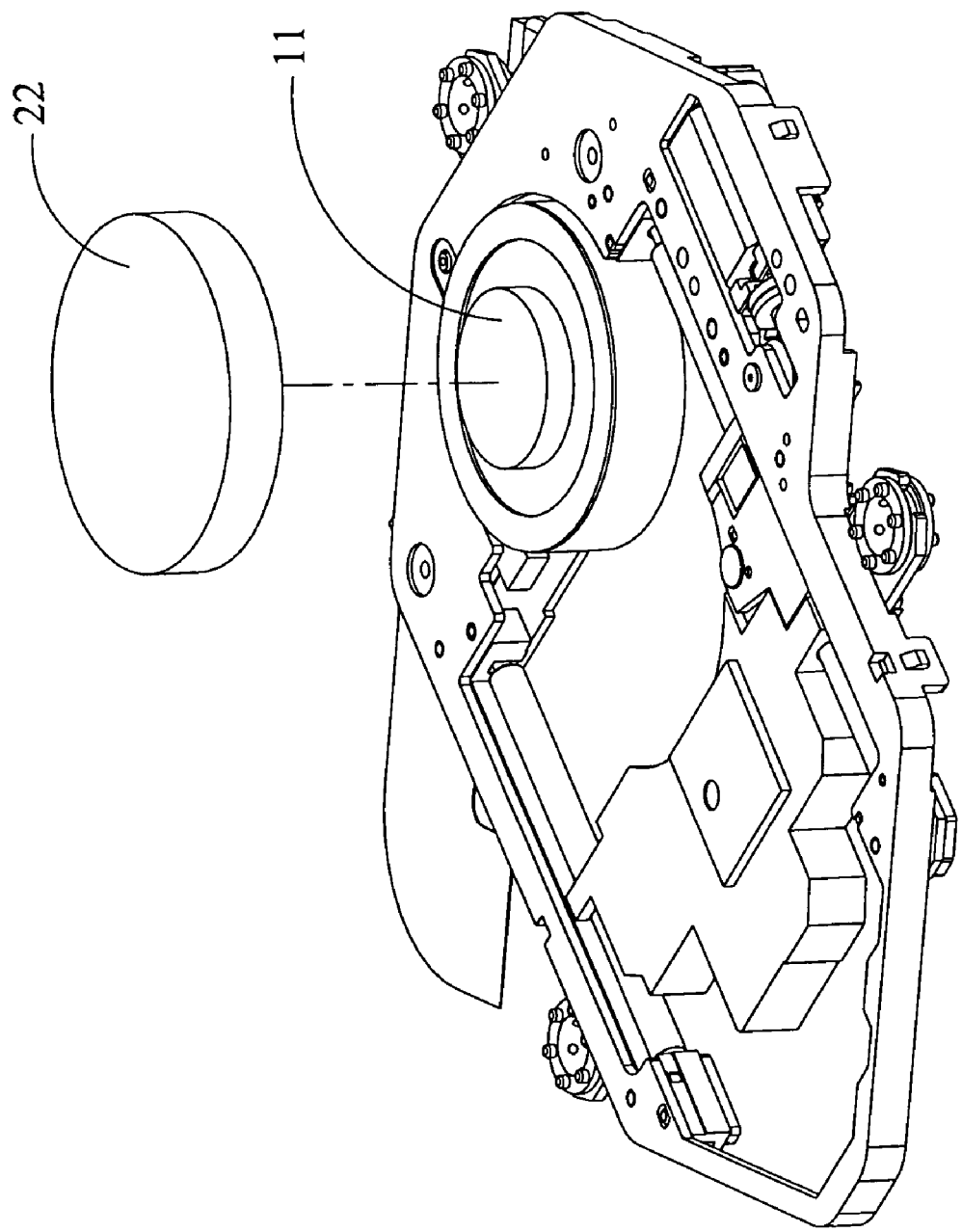
Figure 2B:
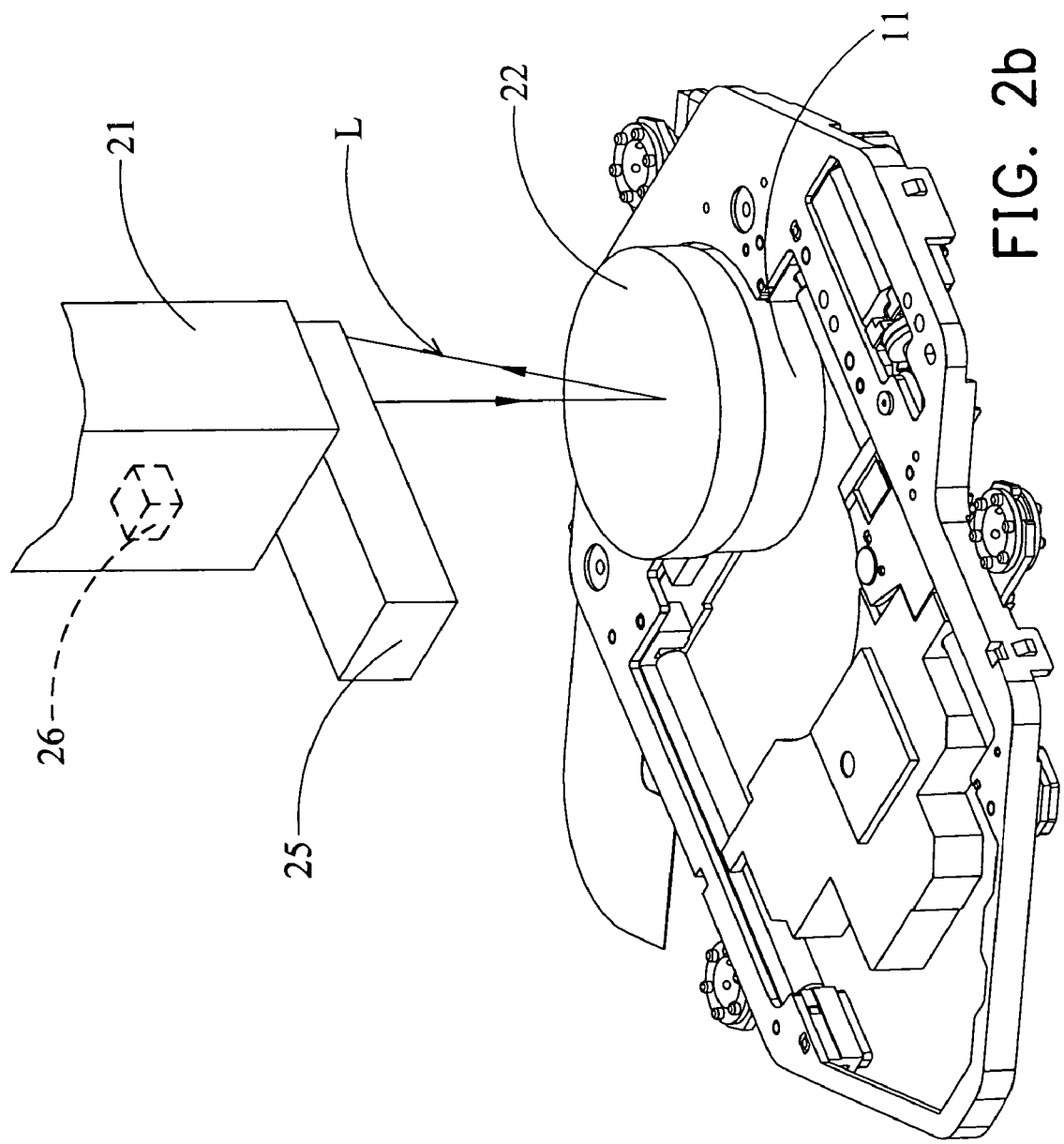
Figure 2C:
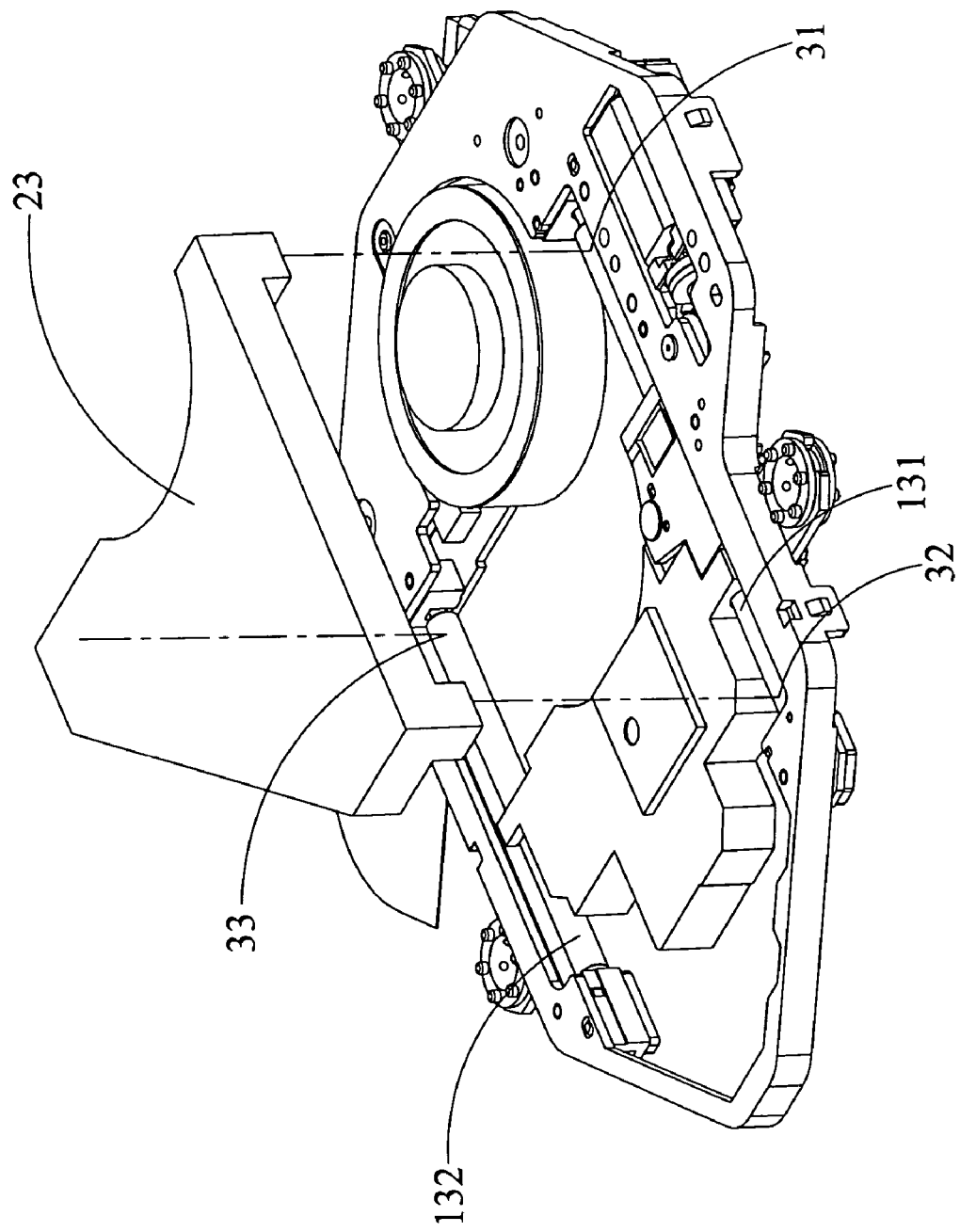
Figure 2D:
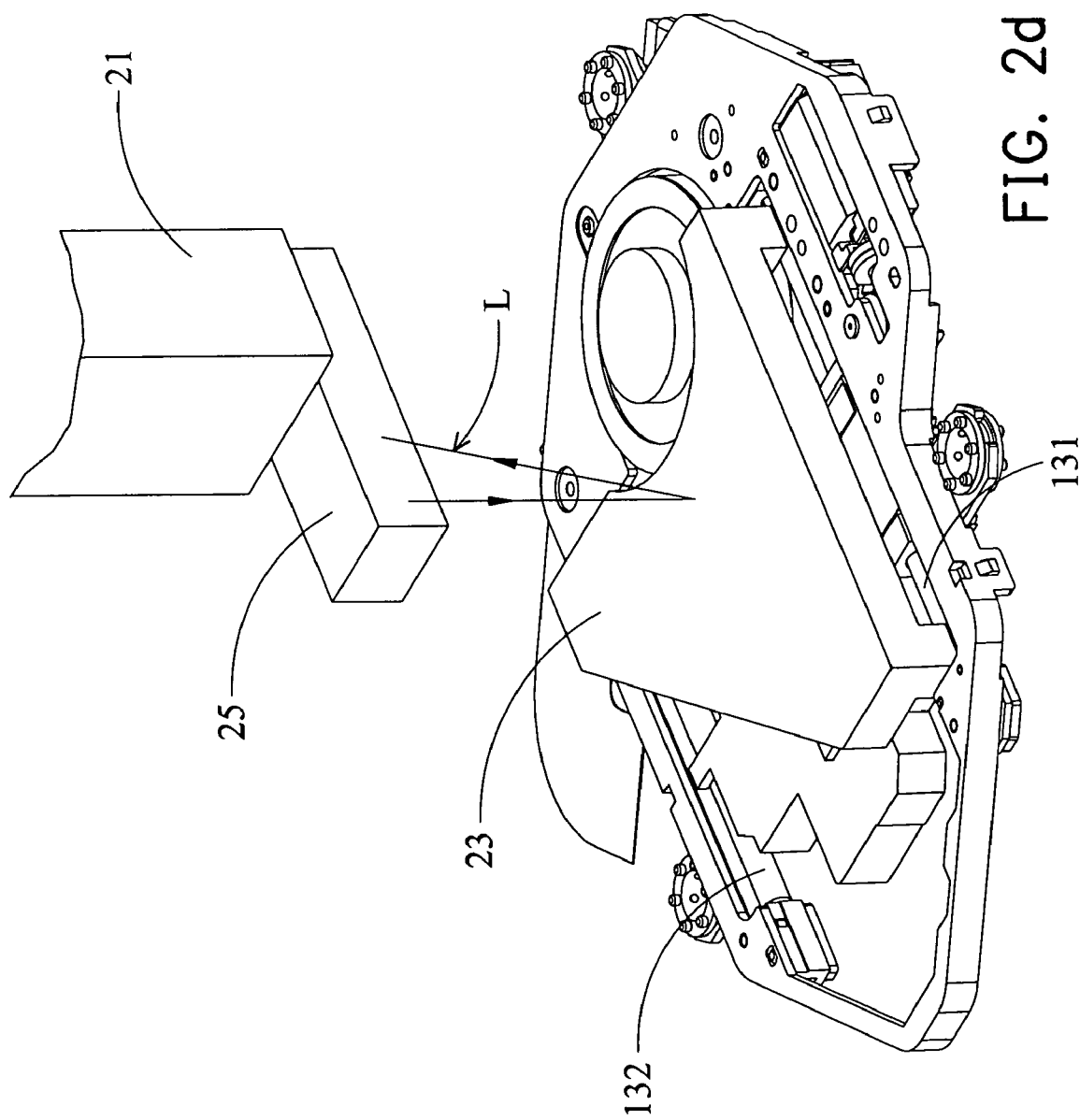
Figure 2E:
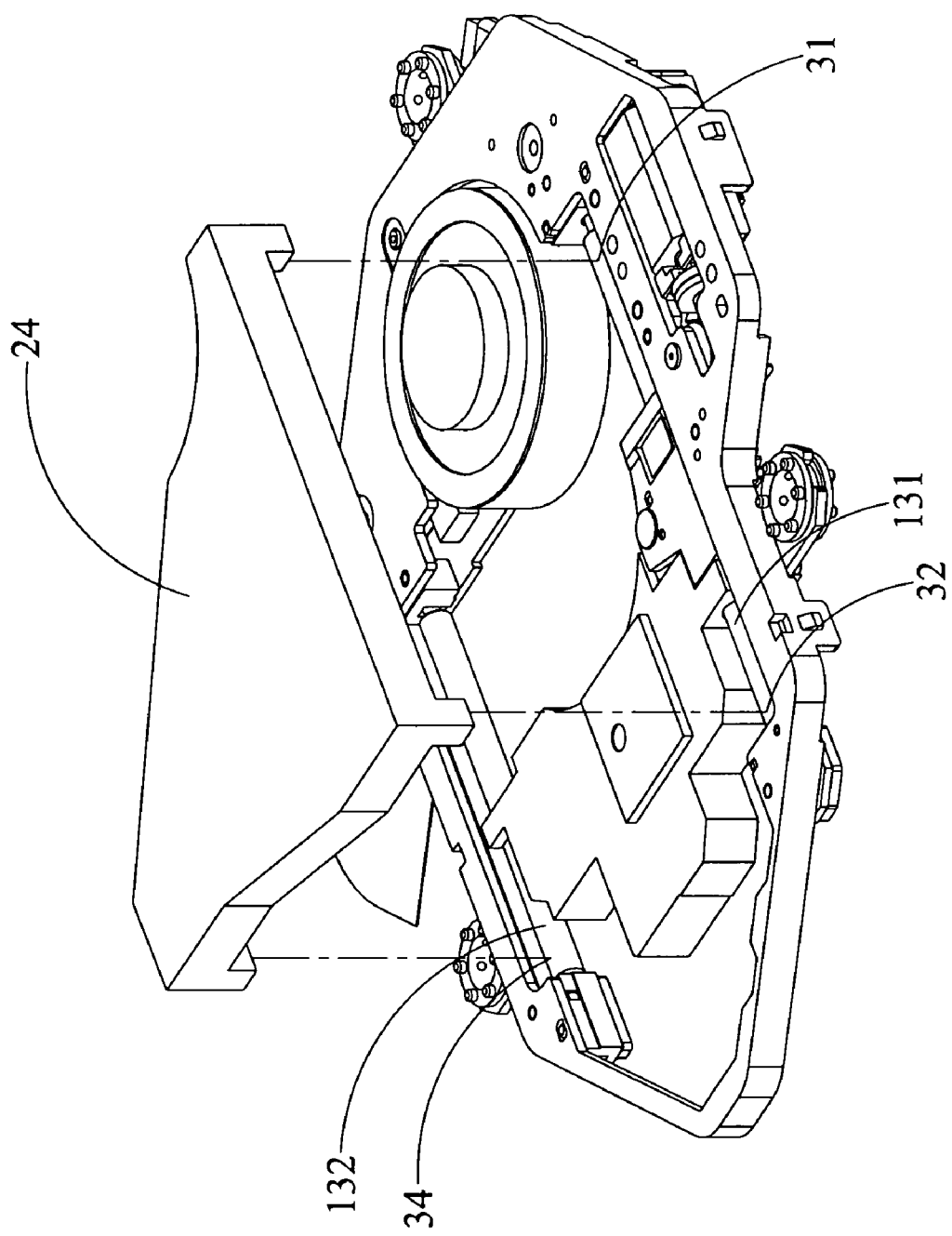
Figure 2F:
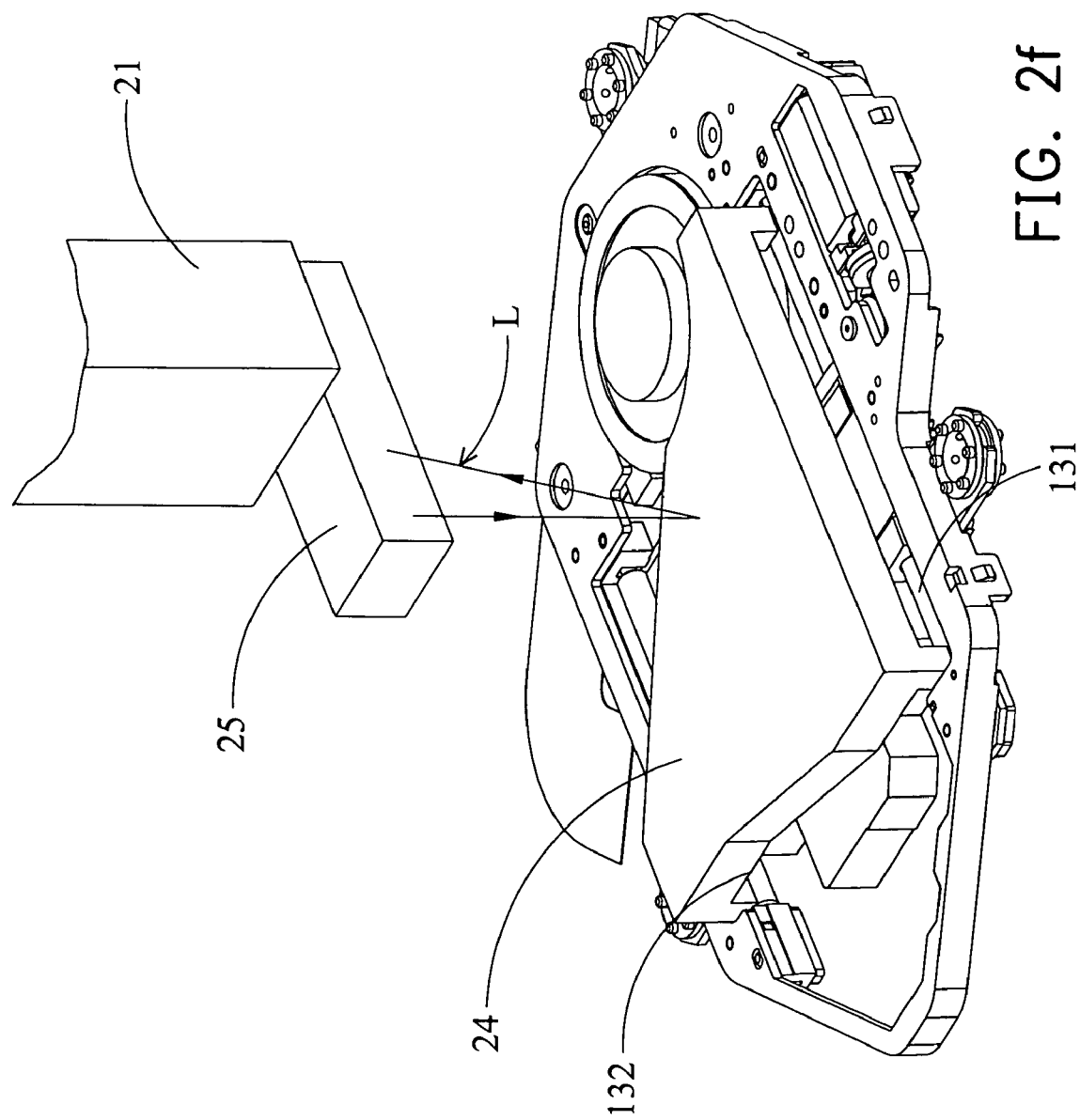

As shown in FIG. 2b, FIG. 2d, and FIG. 2f, the laser collimator 21 is used for emitting a laser light on the first reflecting member 22, the second reflecting member 23, and the third reflecting member 24. The laser collimator 21 includes an image pickup 26 for obtaining a light point reflected back to the laser collimator 21 from the first reflecting member 22, the second reflecting member 23, and the third reflecting member 24 to form images so that a normal vector $N_T$ of a turntable and a normal vector $N_B$ of the guide bar of the traverse module 10 of the optical disc drive are measured as shown in FIG. 1a.

As shown in FIG. 2a and FIG. 2b, the first reflecting member 22 is disposed on the turntable 11 of the traverse module 10. As shown in FIG. 2c and FIG. 2d, the second reflecting member 23 is disposed on the guide bar 13 of the traverse module 10 at a first position, and is in contact with the first bar 131 at a first point 31 and a second point 32 and is in contact with the second bar 132 at a third point 33. Furthermore, as shown in FIG. 2e and FIG. 2f, the third reflecting member 24 is disposed on the guide bar 13 of the traverse module 10 at a second position, and is in contact with the first bar 131 at the first point 31 and the second point 32 and is in contact with the second bar 132 at a fourth point 34.

It is noted that the contact points between the second reflecting members 23 and the first bar 131 are the same as those between the third reflecting member 24 and the first bar 131 in this embodiment. It is convenient, but not limited to the following description; that is, the contact points between the second reflecting members 23 and the first bar 131 may not be the same as those between the third reflecting member 24 and the first bar 131. In contrast, the position of the third point 33 must be different from that of the fourth point 34.

Furthermore, it is understood that a surface, facing the laser collimator 21, of each of the reflecting members 22, 23, 24 is made of reflective material. Thus, the laser light from the laser collimator 21 can be reflected back to the laser collimator 21 by the reflecting members 22, 23, 24.

The beam splitter 25 is disposed between the laser collimator 21 and the reflecting members 22, 23, 24. The beam splitter 25 is used for guiding the laser light L emitted from the laser collimator 2 to a predetermined position of each on the reflecting members 22, 23, 24.

In addition, it is understood that the adjusting device further includes an adjusting unit (not shown) for adjustment of the adjusting screws 14, 15, 16 of the traverse module 10 based on the normal vector $N_T$ of the turntable and the normal vector $N_B$ of the guide bar by the laser collimator 21 so that the first bar 131 of the traverse module 10 is parallel with the second bar 132 of the traverse module 10. Thus, an optical axis of the optical pickup 12 of the traverse module 10 can be parallel with the normal vector $N_T$ of the turntable.

The adjusting device of this invention is described above, and a method for adjusting an optical axis of an optical disc drive as disclosed in this invention is described as follows.

Before the adjusting method of this invention is described in detail, the relationship between the optical axis of the optical pickup and the optical disc must be reviewed.

As stated above, to enhance the optical quality of the optical disc drive, the optical axis of the optical pickup should be normal with the surface of the optical disc. Furthermore, as shown in FIG. 1a, when the optical axis of the optical pickup is normal with the surface of the optical disc, the optical axis of the optical pickup is parallel with the normal vector $N_T$ of the turntable so that the optimal adjustment of the adjusting screws 14, 15, 16 can be attained. It is noted that an oblique vector $N_P$ of the optical axis of the optical pickup relative to the base 17 can be produced during the manufacture thereof. If the normal vector $N_T$ of the turntable and the normal vector $N_B$ of the guide bar can be measured, the optimal adjustment can be obtained by the geometrical relationship. However, since the turntable 11 may be axially runout, the normal vector NT of the turntable 11 may be changed due to the rotating angle of the turntable 11. In addition, since both the first bar 131 and the second bar 132 are disposed on a body of the optical disc drive at two locations respectively, the normal vector $N_B$ of the guide bar may be changed due to the difference of the position of the optical pickup 12 on the guide bar 13.

Thus, the main subject of this invention is to obtain the optimal adjustment of the adjusting screws 14, 15, 16 so that the optimal adjustment of the adjusting mechanism of the optical disc drive can be obtained. The following is the deduction process.

Figure 3:
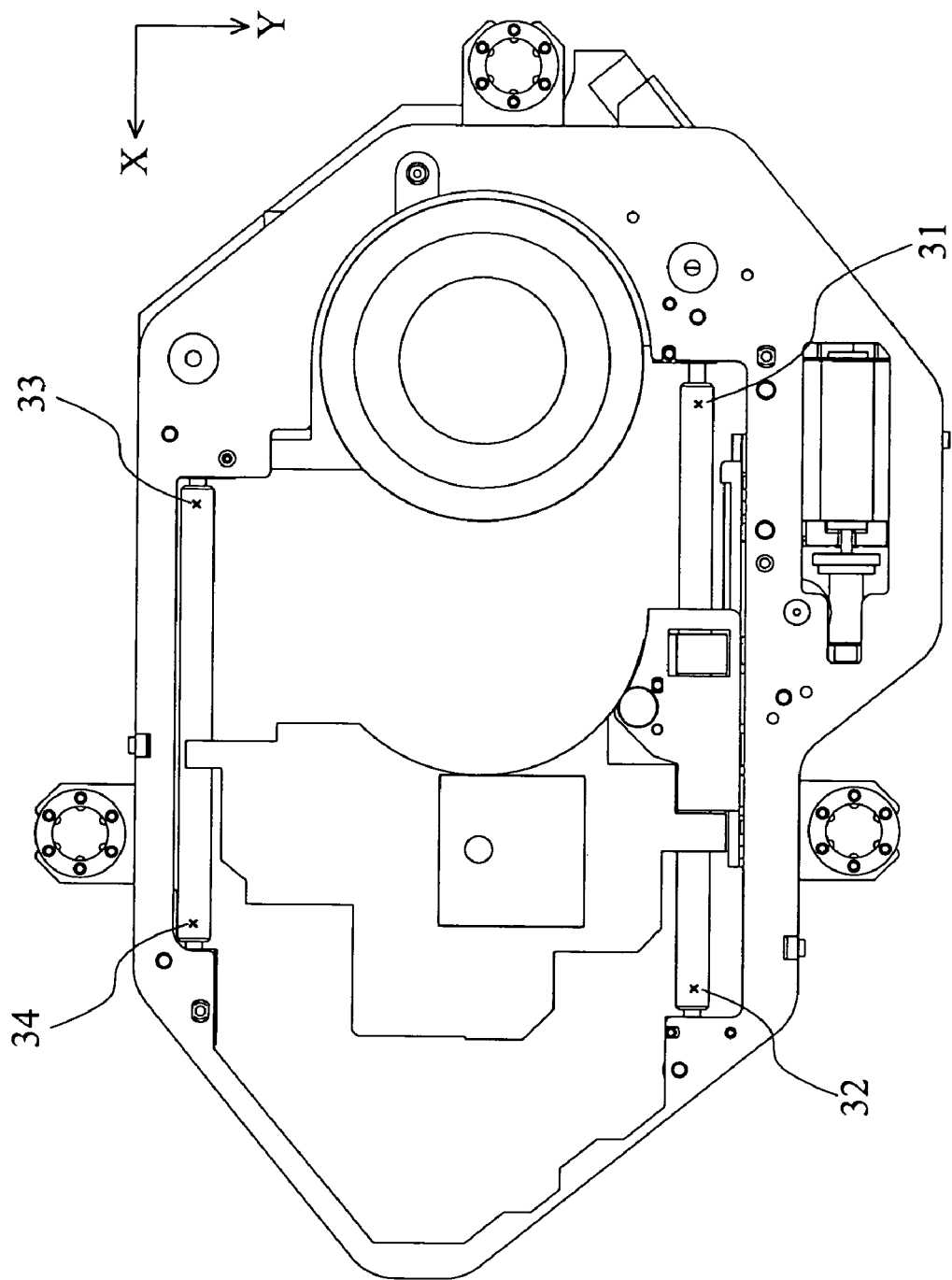
FIG. 3 is a plane view of a traverse module of the optical disc drive as disclosed in this invention, wherein a contact point between the reflecting members and the guide bar is shown.

First, referring to FIGS. 2c, 2e, 3, the first point 31 is used as an original point, and a line connected to the first point 31 and the second point 32 is used as a basic axis. The coordinate of the first point 31 is (0, 0, 0), and the coordinate of the second point 32 is $(L_1, 0, A)$, and the coordinate of the third point 33 is $(L_{2I}, -L_3, B_I)$, and the coordinate of the fourth point 34 is $(L_{2O}, -L_3, B_O)$.

Second, a vector from the first point 31 to the second point 32 is $S_1$, and a vector from the first point 31 to the third point 33 is $S_{2I}$. Thus, the cross product of $S_1$ and $S_{2I}$ is $(-AL_3, BL_1-AL_{2I}, L_1L_3)$. According to this cross product, an oblique vector of the second reflecting member 23 is $(-AL_3/L_1L_3, (B_IL_1-AL_{2I})/L_1L_3)$ (hereinafter referring to a first initial vector $(X_{1S}, Y_{1S})$ that can be calculated by the laser collimator 21). That is, $A=X_{1S} L_1$, $B_I=-X_{1S} L_{2I}-Y_{1S} L_3$.

By the same theorem, an oblique vector of the third reflecting member 24 is $(-AL_3/L_1L_3, (B_OL_1-AL_{2O})/L_1L_3)$ (hereinafter referring to a second initial vector $(X_{2S}, Y_{2S})$ that can be calculated by the laser collimator 21). That is, $B_O=-X_{2S} L_{2O}-Y_{2S} L_3$.

If the oblique vector of the optical pickup of the optical disc drive is known as $(X_P, Y_P)$ and the normal vector of the turntable is known as $(X_{TT}, Y_{TT})$, the object normal vector of the second reflecting member 23 and the third reflecting member 24 (representing the guide bar 13) is $(X_P-X_{TT}, Y_P-Y_{TT})$.

If the object normal vector of the second reflecting member 23 is $(-A_TL_3/L_1L_3, (B_{IT}L_1-A_TL_{2I})/L_1L_3)$ and the object normal vector of the third reflecting member 24 is $(-A_TL_3/L_1L_3, (B_{OT}L_1-A_TL_{2O})/L_1L_3)$, the object value is the following.

$$A_T=L_1(X_P-X_{TT});$$

$$B_{IT}=-(X_P-X_{TT})L_{2I}+(Y_P-Y_{TT})L_3;$$

$$B_{OT}=-(X_P-X_{TT})L_{2O}+(Y_P-Y_{TT})L_3.$$

By the object value minus the initial value, a proximal adjusting value of the first adjusting screw 14 can be obtained $(A_F=A_T-A)$, and a proximal adjusting value of the second adjusting screw 15 can be obtained $(B_{IF}=B_{IT}-B_I)$, and a proximal adjusting value of the third adjusting screw 16 can be obtained $(B_{OF}=B_{OT}-B_O)$. It is noted that the position of the third point 33 cannot be located on the second adjusting screw 15, and the position of the fourth point 34 cannot be located on the third adjusting screw 16. A distance between the third point 33 and the second adjusting screw 15 is $L_{IO}$, and a distance between the fourth point 34 and the third adjusting screw 16 is $L_{OO}$. By the geometrical calculation, the adjustment amount of the first adjusting screw 14 is $(X_{2S}-X_{TT}+X_P)L_1$, and the adjustment amount of the second adjusting screw 15 is $(X_{1S}-X_{TT}+X_P)L_{2I}+(Y_{TT}-Y_P-Y_{1S})L_3-[(X_{2S}-X_{TT}+X_P)L_{2O}+(Y_{TT}-Y_P-Y_{2S})L_3-(X_{1S}-X_{TT}+X_P)L_{2I}-(Y_{TT}-Y_P-Y_{1S})L_3]L_{IO}/(L_{2O}-L_{2I})$, and the adjustment amount of the third adjusting screw 16 is adjusted by $(X_{2S}-X_{TT}+X_P)L_{2O}+(Y_{TT}-Y_P-Y_{2S})L_3+[(X_{2S}-X_{TT}+X_P)L_{2O}-(Y_{TT}-Y_P-Y_{2S})L_3-(X_{1S}-X_{TT}+X_P)L_{2I}-(Y_{TT}-Y_P-Y_{1S})L_3]L_{OO}/(L_{2O}-L_{2I})$.

As stated above, after the adjusting amount of each of the adjusting screws 14, 15, 16 is obtained, the adjusting method of this invention can be performed. It is understood that an oblique vector $(X_P, Y_P)$ of the optical axis of the optical pickup of the optical disc drive can be obtained during the manufacture of the optical pickup.

First, as shown in FIG. 2a, the first reflecting member 22 is disposed on the turntable 11 of the traverse module 10. Then, the turntable 11 rotates so that the first reflecting member 22 disposed on the turntable 11 is also rotated. Subsequently, as shown in FIG. 2b, the laser light L is emitted on the rotating first reflecting member 22 by the laser collimator 21. A normal vector $(X_{TT}, Y_{TT})$ of the turntable 11 can be measured based on a light point reflected to the laser collimator 21 from the first reflecting member 22. It is noted that a circular trace is formed by the light point reflected to the laser collimator 21 from the first reflecting member 22, and the normal vector of the turntable 11 is calculated based on a center of the circular trace.

Second, as shown in FIG. 2c, the second reflecting member 23 is disposed on the first bar 131 and the second bar 132 of the traverse module 10 in a manner such that it is in contact with the first bar 131 at a first point 31 and a second point 32 and is in contact with the second bar 132 at a third point 33. Then, as shown in FIG. 2d, a laser light L is emitted on the second reflecting member 23 by the laser collimator 21, and a first initial vector $(X_{1s}, Y_{1s})$ is measured based on a light point reflected to the laser collimator 21 from the second reflecting member 23.

Third, the third reflecting member 24 is disposed on the first bar 131 and the second bar 132 of the traverse module 10 in a manner such that it is in contact with the first bar 131 at the first point 31 and the second point 32 and is in contact with the second bar 132 at a fourth point 34. Then, as shown in FIG. 2f, a laser light L is emitted on the third reflecting member 24 by the laser collimator 21, and a second initial vector $(X_{2s}, Y_{2s})$ is measured based on a light point reflected to the laser collimator 21 from the third reflecting member 24.

Finally, based on the oblique vector $(X_p, Y_p)$ of the optical axis of the optical pickup of the optical disc drive, the normal vector $(X_{TT}, Y_{TT})$ of the turntable, the first initial vector $(X_{1s}, Y_{1s})$, and the second initial vector $(X_{2s}, Y_{2s})$, the adjustment amount of the first adjusting screw 14 is $(X_{2s}-X_{TT}+X_p)L_1$, and the adjustment amount of the second adjusting screw 15 is $(X_{1s}-X_{TT}+X_p)L_{2I}+(Y_{TT}-Y_p-Y_{1s})L_3-[(X_{2s}-X_{TT}+X_p) \ L_{2O}+(Y_{TT}-Y_p-Y_{2s})L_3-(X_{1s}-X_{TT}+X_p)L_{2I}-(Y_{TT}-Y_p-Y_{1s})L_3]L_{IO}/(L_{2O}-L_{2I})$, and the adjustment amount of the third adjusting screw 16 is adjusted by $(X_{2s}-X_{TT}+X_p) \ L_{2O}+(Y_{TT}-Y_p-Y_{2s})L_3+[(X_{2s}-X_{TT}+X_p)L_{2O}(Y_{TT}-Y_p-Y_{2s})L_3-(X_{1s}-X_{TT}+X_p)L_{2I}-(Y_{TT}-Y_p-Y_{1s})L_3] \ L_{OO}/(L_{2O}-L_{2I})$. Based on the adjustment amounts of the adjusting screws 14, 15, 16, the adjusting screws 14, 15, 16 are adjusted so that the first bar 131 is made parallel to the second bar 132. Thus, the optical axis of the optical pickup is parallel to the normal vector $N_T$ of the turntable.

By the adjusting device and method of this invention, the optimal adjustment can be determined simply by the optical quality. Thus, the other factors, such as the difference of the optical discs or the electronic signal, can be prevented from affecting the determination of the optimal adjustment. As a result, the optical disc drive can more accurately obtain the data of the optical disc.

Compared with the conventional adjustment method by RF signal jittering or the error rate, the determining standard of the adjusting method of this invention is more clear and precise. After the automatic adjusting unit is introduced, the adjusting time of the optical axis of the optical pickup and assembly cost thereof can be greatly reduced.

While the invention has been described by way of example and in terms of the preferred embodiment, it is to be understood that the invention is not limited to the disclosed embodiment. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A device for adjusting an optical axis of an optical disc drive having a base, a turntable, and a guide bar, comprising:
   a plurality of reflecting members disposed on the optical disc drive, the reflecting members including a first reflecting member, a second reflecting member, and a third reflecting member, wherein the second reflecting member is disposed on the guide bar of the optical disk drive at a first position and the third reflecting member is disposed on the guide bar at a second position; and
   a laser collimator for emitting a laser light on the reflecting members and measuring a normal vector of the base of the optical disc drive and a normal vector of the turntable of the optical disc drive, wherein a surface, facing the laser collimator, of each of the reflecting members is made of reflective material, and the laser collimator includes an image pickup for sensing a light point reflected back to the laser collimator from the reflecting members to form images.

2. The device as claimed in claim 1 wherein the guide bar of the optical disk drive is a first guide bar, and further comprising:
   an adjusting unit for adjustment of adjusting screws of the optical disc drive so that the first bar of the optical disc drive is parallel to a second bar of the optical disc drive and an optical axis of the optical pickup of the optical disc drive is parallel to the normal vector of the turntable.

3. The device as claimed in claim 1, further comprising:
   a beam splitter, disposed between the laser collimator and the reflecting members, for guiding the laser light emitted from the laser collimator to a predetermined position on each of the reflecting members.

4. The device as claimed in claim 1, wherein the reflecting members and laser collimator are employed to adjust the optical axis of the optical disc drive during manufacture of the optical disc drive, and are not part of the optical disc drive itself.

5. The device as claimed in claim 1, wherein the first reflecting member is placed on the turntable of the optical disc drive.

* * * * *